(12) United States Patent
Kajitani

(10) Patent No.: US 6,441,966 B2
(45) Date of Patent: Aug. 27, 2002

(54) MICROSCOPE OBJECTIVE LENS AND MICROSCOPE USING THE SAME

(75) Inventor: Kazuo Kajitani, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/795,313

(22) Filed: Mar. 1, 2001

(30) Foreign Application Priority Data

Mar. 1, 2000 (JP) ........................................ 2000-060416

(51) Int. Cl.⁷ ........................... G02B 21/26; G02B 21/02
(52) U.S. Cl. ........................ 359/660; 359/368; 359/391; 359/658
(58) Field of Search ................................ 359/362, 368, 359/369, 380, 391–393, 396–398, 656–661, 900

(56) References Cited

U.S. PATENT DOCUMENTS

| 3,623,792 | A | * | 11/1971 | Uetake | 359/656 |
|---|---|---|---|---|---|
| 4,059,342 | A | * | 11/1977 | Tojyo | 359/661 |
| 4,212,515 | A | * | 7/1980 | Itaya | 359/661 |
| 4,588,264 | A | * | 5/1986 | Shimizu | 359/656 |
| 5,406,421 | A | | 4/1995 | Kashima et al. | 359/656 |
| 5,699,196 | A | * | 12/1997 | Misawa | 359/659 |
| 5,739,958 | A | | 4/1998 | Abe | 359/659 |
| 5,861,996 | A | | 1/1999 | Yamaguchi | 359/658 |

FOREIGN PATENT DOCUMENTS

JP        11-101943        4/1999

* cited by examiner

*Primary Examiner*—Thong Nguyen
(74) *Attorney, Agent, or Firm*—Pillsbury Winthrop LLP

(57) ABSTRACT

A microscope objective lens is constructed with fixed lens units having a numerical aperture NA which is $0.6 \leq NA \leq 0.8$ and a magnification β which is $40 \leq \beta \leq 63$, to observe a sample placed on a sample holding member and covered with a protective transparent member having a thickness t which is $0.1 \text{ mm} < t < 0.15 \text{ mm}$.

8 Claims, 2 Drawing Sheets

IMAGING LENS

IMAGING LENS

MICROSCOPE OBJECTIVE LENS AND MICROSCOPE USING THE SAME

BACKGROUND OF THE INVENTION

1. Field of the Invention

This invention relates to a transmission type illumination optical microscope, and in particular, to an objective lens used in this microscope and a method of using the microscope.

2. Description of Related Art

FIG. 1 shows a schematic structure of an example of a conventional transmission type illumination optical microscope. In this figure, reference numeral 21 represents an eyepiece; 22, a lens barrel; 23, a microscope frame; 24, a revolver attached to the lower portion of the lens barrel 22 through the microscorpe frame 23; 25, an objection lens mounted to the revolver 24; 26, a stage supporting section attached to the microscope frame 23 so that it can be raised and lowered; 27, a lower stage retained on the stage supporting section 26 so that it can be moved along an X axis (or a Y axis) with respect to the stage supporting section 26; 28, an upper stage retained on the lower stage 27 so that it can be moved in a direction perpendicular to the lower stage 27, that is, along the Y axis (or the X axis) with respect to the stage supporting section 26; 29, a surface illuminant fitted into the upper stage 28 with respect to the lower stage 27; 32, a lower stage control knob for moving the lower stage 27, together with the upper stage 28, with respect to the stage supporting section 26, and 33, a focusing knob for raising and lowering the stage supporting section 26 through the microscope frame 23.

The lower stage 27 and the upper stage 28 constitute a microscope stage. The specimen 30 is placed on the surface illuminant 29 through hard glass or sapphire glass and is held on the stage by a well-known clamp, not shown. Focusing is performed by turning the focusing knob 33, and when the stage control knob 31 or 32 is turned, the specimen 30 is moved in the X or Y direction. In this way, a desired observation is carried out.

Consider the case of cytodiagnosis in which such a transmission type illumination optical microscope is used. The specimen 30, as shown in FIG. 2, is made in such a away that cells of a sample are placed on a slide glass 30a (preparation) which is a sample holding member, and are covered with a glass cover 30b which is a protective transparent member, and thereby the sample is sealed between the sample holding member 30a and the protective transparent member 30b. In this case, the protective transparent member 30b usually has a thickness of 0.17 mm, and it is common practice that the objective lens 25 used is corrected for spherical aberration in accordance with this thickness of the protective transparent member 30b. For a dry objective lens which has a numerical aperture (NA) of 0.8 or more, in order to accommodate variations in thickness of the protective transparent member 30b, some of protective transparent members are designed so that spherical aberration can be corrected, ranging in thickness from 0.1 to 0.2 mm.

In recent years, high-speed and low-cost treatment in such cytodiagnosis and histodiagnosis has become necessary. Consequently, the high-speed preparation of the specimen 30 has also become necessary. This brings about the advent of an automatic sealing machine in which high-speed treatment of preparation of the specimen, namely sealing work of the sample, is realized (500–1000 pieces per hour). According to this machine, instead of the conventional glass cover used as the protective transparent member 30b, a transparent macromolecular film (0.1 mm in thickness), for example, like cellulose acetate, to which an adhesive sealant is applied, is used and pressed against the sample holding member on which the sample is placed, to thereby obtain a protective transparent member with a thickness of approximately 0.12 mm, including the layer thickness (0.02 mm) of the sealant. When this specimen is observed through a common objective lens such as that mentioned above, observation is carried out in a state where spherical aberration is not completely corrected, and thus there is the problem that the actual state of the sample cannot be correctly analyzed. In order to solve this problem, it is conceivable to use an objective lens in which the spherical aberration can be corrected with respect to a change in thickness of the protective transparent member, mentioned above. However, the objective lens of this type is very expensive and in addition, requires a manual operation for correction. Hence, the problem arises that not only does this cause in increase in treatment cost of cytodiagnosis or histodiagnosis, but it cannot completely meet the requirement for handling a large amount of specimens at a high speed.

SUMMARY OF THE INVENTION

It is, therefore, an object of the present invention to provide a microscope objective lens which allows favorable and easy observation of the sample of a specimen provided with a protective transparent member having a thickness in a predetermined range, including a specimen made by the automatic sealing machine, and to provide a microscope using this objective lens and a method of using the microscope. In order to achieve this object, the microscope objective lens according to the present invention is constructed with fixed lens units having a numerical aperture NA which is $0.6 \leq NA \leq 0.8$ and a magnification $\beta$ which is $40 \leq \beta \leq 63$, to observe a sample placed on the sample holding member and covered with the protective transparent member having a thickness t which is 0.1 mm<t<0.15 mm. The microscope according to the present invention includes a stage for supporting a sample placed on the sample holding member and covered with the protective transparent member having the thickness t which is 0.1 mm<t<0.15 mm; an objective lens constructed with fixed lens units having the numerical aperture NA which is $0.6 \leq NA \leq 0.8$ and the magnification $\beta$ which is $40 \leq \beta \leq 63$, to form a magnified image of the sample; and an eyepiece for observing the magnified image of the sample formed by the objective lens.

The method of using the microscope according to the present invention is to place the sample on the sample holding member and to cover the sample with the protective transparent member having the thickness t which is 0.1 mm<t<0.15 mm so that it is observed through the protective transparent member, the objective lens constructed with the fixed lens units having the numerical aperture NA which is $0.6 \leq NA \leq 0.8$ and the magnification $\beta$ which is $40 \leq \beta \leq 63$, and the eyepiece.

This and other objects as well as features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
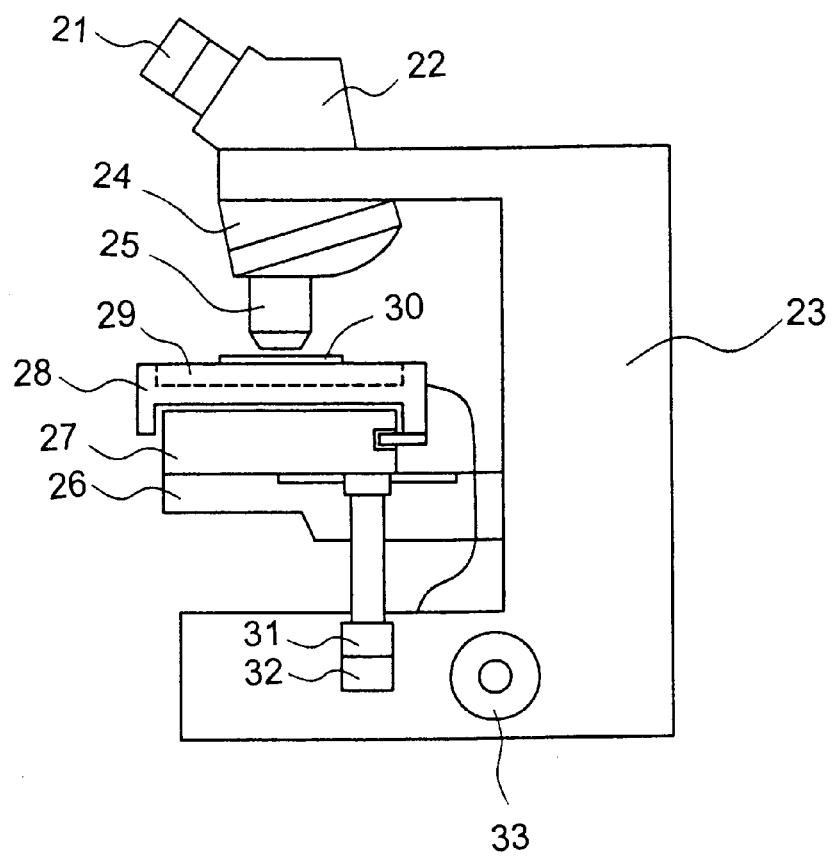
FIG. 1 is a side view showing a schematic structure of an example of a conventional transmission type illumination optical microscope.

In accordance with the embodiments shown in the drawings, the present invention will be described below.

Figure 2:
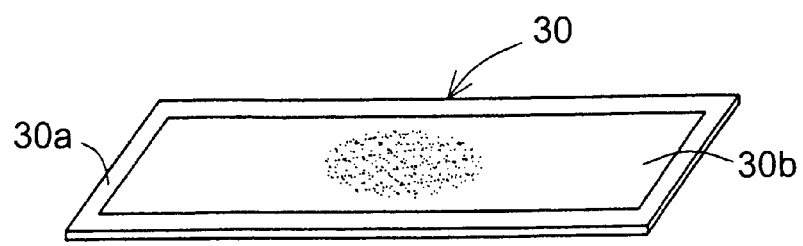
FIG. 2 is a perspective view showing an example of a specimen.
Figure 3:
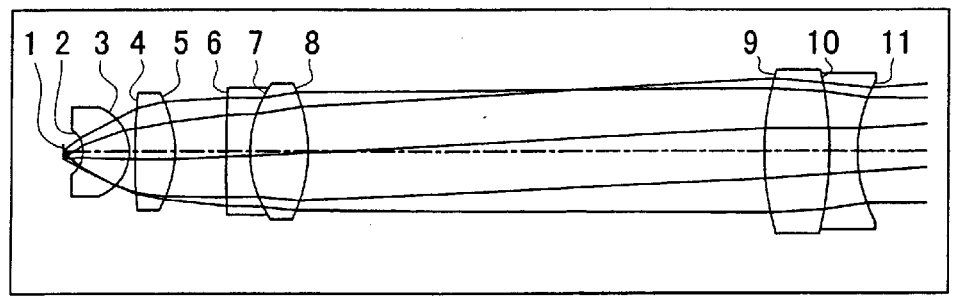
FIG. 3 is a view showing a lens arrangement in a first embodiment of the microscope objective lens according to the present invention.
Figure 3:
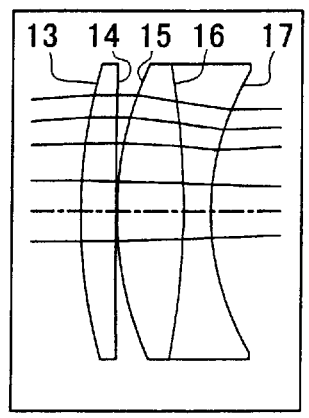
Figure 4:
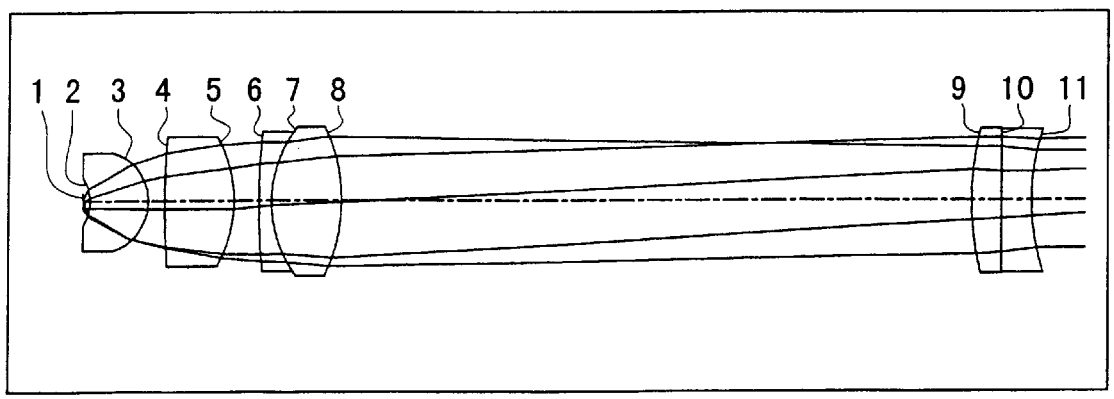
FIG. 4 is a view showing a lens arrangement in a second embodiment of the microscope objective lens according to the present invention.

The macromolecular film used as the protective transparent member 30b (see FIG. 2) in the automatic sealing machine described with reference to the prior art has a thickness of 0.1–0.15 mm in view of flatness and cost. In the embodiments of the present invention, a film with the thickness of 0.12 mm is employed, and two kinds of objective lenses constructed with fixed lens units in which spherical aberration is corrected in accordance with this thickness are provided to observe the specimen. In reference to FIGS. 3 and 4, lens data of the objective lenses according to the first and second embodiments are shown below. It is noted that the surface number 12 in each of the lens data represents an imaginary surface (not shown) where the objective lens is mounted. In FIGS. 3 and 4, lens data of the objective lenses are as follows:

First embodiment
NA = 0.65   β = 40×

| Surface | R | d | nd | Vd | |
|---|---|---|---|---|---|
| Specimen surface | ∞ | 0.1200 | 1.48749 | 70.23 | protective transparent member |
| 1 | ∞ | 0.8616 | | | |
| 2 | −1.64034 | 2.4300 | 1.78650 | 50.00 | |
| 3 | −2.50140 | 0.2600 | | | |
| 4 | 30.63382 | 2.1800 | 1.49700 | 81.61 | |
| 5 | −5.46287 | 2.640000 | | | |
| 6 | 35.24145 | 1.3700 | 1.84666 | 23.78 | |
| 7 | 6.89344 | 3.0100 | 1.43875 | 94.97 | |
| 8 | −7.65820 | 24.5200 | | | |
| 9 | 18.88750 | 3.4300 | 1.78650 | 50.00 | |
| 10 | −14.12677 | 1.5000 | 1.49831 | 65.03 | |
| 11 | 7.54522 | 2.6744 | | | |
| 12 | ∞ | 50.0 | | | |
| 13 | 56.90327 | 3.0000 | 1.48749 | 70.21 | Imaging lens |
| 14 | 310.05549 | 0.3358 | | | |
| 15 | 32.53850 | 6.0000 | 1.72342 | 37.95 | |
| 16 | −87.52198 | 2.6000 | 1.71850 | 33.52 | |
| 17 | 25.77751 | 151 | | | |
| Image plane | ∞ | | | | |

Second embodiment
NA = 0.8   β = 60×

| Surface | R | d | nd | Vd | |
|---|---|---|---|---|---|
| Specimen surface | ∞ | 0.1200 | 1.48749 | 70.23 | protective transparent member |
| 1 | ∞ | 0.3 | | | |
| 2 | −1.60604 | 2.9700 | 1.78650 | 50.00 | |
| 3 | −2.30350 | 0.540150 | | | |
| 4 | 28.09533 | 3.3800 | 1.56907 | 71.30 | |
| 5 | −7.28858 | 1.2245 | | | |
| 6 | 32.26382 | 0.8000 | 1.80518 | 25.43 | |
| 7 | 5.78971 | 3.3500 | 1.43875 | 94.97 | |
| 8 | −7.57589 | 31.2779 | | | |
| 9 | 18.71944 | 1.5000 | 1.76182 | 26.52 | |
| 10 | ∞ | 1.5000 | 1.52130 | 52.55 | |

-continued

| | | | | | |
|---|---|---|---|---|---|
| 11 | 10.33604 | −1.9665 | | | |
| 12 | ∞ | 50.0 | | | |
| 13 | 56.90327 | 3.0000 | 1.48749 | 70.21 | Imaging lens |
| 14 | 310.05549 | 0.3358 | | | |
| 15 | 32.53850 | 6.0000 | 1.72342 | 37.95 | |
| 16 | −87.52198 | 2.6000 | 1.71850 | 33.52 | |
| 17 | 25.77751 | 151 | | | |
| Image plane | ∞ | | | | |

The objective lens of the first embodiment, as shown in FIG. 3, includes a front lens unit with a positive refracting power and a rear lens unit with a positive refracting power. The front lens unit is constructed with a meniscus lens directing its concave surface toward the specimen side, a biconvex lens, and a cemented doublet combining a concave lens and a convex lens. The rear lens unit is constructed with a cemented doublet combining a biconvex lens and a biconcave lens. A focal length $f_F$ of the front lens unit is 4.87 mm and a focal length $f_R$ of the rear lens unit is 342 mm. The ratio of the focal length between the front lens unit and the rear lens unit, $f_R/f_F$, is 70.2 in terms of an absolute value, and the refracting power of the rear lens unit is much smaller than that of the front lens unit.

The objective lens of the second embodiment, as shown in FIG. 4, includes a front lens unit with a positive refracting power and a rear lens unit with a negative refracting power. The front lens unit is constructed with a meniscus lens directing its concave surface toward the specimen side, a biconvex lens, and a cemented doublet combining a concave lens and a convex lens. The rear lens unit is constructed with a cemented doublet combining a biconvex lens and a biconcave lens. The focal length $f_F$ of the front lens unit is 5.3 mm and the focal length $f_R$ of the rear lens unit is −393 mm. The ratio of the focal length between the front lens unit and the rear lens unit, $f_R/f_F$, is 68.5 in terms of an absolute value, and the refracting power of the rear lens unit, as in the first embodiment, is much smaller than that of the front lens unit.

As mentioned above, the objective lens of the present invention has the front lens unit with a positive refracting power and the rear lens unit with a weaker refracting power than in the front lens unit. The front lens unit is provided with a meniscus lens directing its concave surface toward the specimen side, a convex lens, and a cemented doublet combining a concave lens and a convex lens. The rear lens unit is provided with a cemented doublet combining a convex lens and a biconcave lens. In this case, the objective lens satisfies a condition: $|f_R/f_F|>68$.

In the lens data of the above embodiments, R represents the radius of curvature of the sample surface of the specimen, the surface of the protective transparent member, each of the lens surfaces, or the image plane; d represents the thickness of the protective transparent member, the thickness of each lens, or the air space between the lens surfaces; nd represents the refractive index of the protective transparent member or each lens in the d-line; and Vd represents the Abbe's number of the protective transparent member or each lens.

For information, in the same specimen, an image of the specimen observed through an objective with the same magnification as in the first embodiment in which aberration is corrected in accordance with a protective transparent member with a thickness of 0.17 is visually compared with an image of the specimen observed through the objective lens of the first embodiment. In this case, the difference in resolution between both images is not distinguished, but when these images are magnified fourfold for comparison, it is found that there is considerable difference of resolution and the objective lens of the first embodiment brings about a better image. In the objective lens of either embodiment, a favorable image of the speciment is obtained when the thickness of the protective transparent member 30b ranges between 0.1 and 0.15 mm.

At the present time, in the field of examination for cytodiagnosis and histodiagnosis, inexpensive objective lenses with a magnification of 40× and a numerical aperture of 0.65 are principally used. As will be obvious from the above description, the objective lens according to the present invention is capable of following this tendency and allows high-speed and low-cost treatment.

What is claimed is:

1. A microscope objective lens adapted for observation of a sample that is placed on a sample holding member and is covered with a protective transparent member having a thickness t which is in a range of 0.1 mm <t<0.15 mm, said microscope objective lens comprising six or less fixed lens elements and having a numerical aperture NA which is in a range of $0.6 \leq NA \leq 0.8$ and a magnification $\beta$ which is in a range of $40 \leq \beta \leq 63$.

2. A microscope objective lens according to claim 1, wherein said sample holding member is a glass plate, and said protective transparent member includes a glass plate with an adhesive or a transparent macromolecular film with an adhesive.

3. A microscope objective lens according to claim 1, wherein some of said lens elements are joined together to be a cemented lens.

4. A microscope comprising:

a stage for supporting a sample that is placed on a sample holding member and is covered with a protective transparent member having a thickness t which is in a range of 0.1 mm<t<0.15 mm;

an objective lens constructed of six or less fixed lens elements and having a numerical aperture NA which is in a range of $0.6 \leq NA \leq 0.8$ and a magnification $\beta$ which is in a range of $40 \leq \beta \leq 63$, to form a magnified image of said sample; and an eye piece for observing the magnified image of said sample formed by said objective lens.

5. A microscope according to claim 4, wherein said sample holding member is a glass plate, and said protective transparent member includes a glass plate with an adhesive or a transparent macromolecular film with an adhesive.

6. A microscope objective lens adapted for observation of a sample that is placed in a sample holding member and is covered with a protective transparent member having a thickness t which is in a range of 0.1 mm <t<0.15 mm, said microscope objective lens comprising fixed lens elements and having a numerical aperture NA which is in a range of $0.6 \leq NA \leq 0.8$ and a magnification $\beta$ which is in a range of $40 \leq \beta \leq 63$, wherein said objective lens has a front lens unit with a positive refracting power and a rear lens unit with a weaker refracting power than in said front lens unit, said front lens unit comprising a meniscus lens directing a concave surface toward a specimen side, a convex lens, and a cemented doubted combining a concave lens and a convex lens, and said rear lens unit comprising a cemented doublet combining a concave lens and a convex lens.

7. A microscope objective lens adapted for observation of a sample that is placed in a sample holding member and is covered with a protective transparent member having a thickness t which is in a range of 0.1 mm <t<0.15 mm, said microscope objective lens comprising fixed lens elements and having a numerical aperture NA which is in a range of $0.6 \leq NA \leq 0.8$ and a magnification $\beta$ which is in a range of $40 \leq \beta \leq 63$, wherein said objective lens has a front lens unit and a rear lens unit and satisfies a condition: $|f_R/f_F|>68$, where $f_F$ is a focal length of said front lens unit and $f_R$ is a focal length of said rear lens unit.

8. A microscope objective lens adapted for observation of a sample that is placed in a sample holding member and is covered with a protective transparent member having a thickness t which is in a range of 0.1 mm <t<0.15 mm, said microscope objective lens comprising fixed lens elements and having a numerical aperture NA which is in a range of $0.6 \leq NA \leq 0.8$ and a magnification $\beta$ which is in a range of $40 \leq \beta \leq 63$, wherein said objective lens has a front lens unit and a rear lens unit, said front lens unit consisting of a meniscus lens directing a concave surface toward a specimen side, a convex lens, and a cemented doublet combining a concave lens and a convex lens, and said rear lens unit consisting of a cemented doublet combining a convex lens and a biconcave lens.

* * * * *